United States Patent [19]

McLaughlin

[11] Patent Number: 5,645,310
[45] Date of Patent: Jul. 8, 1997

[54] RETAINING DEVICE AND METHOD FOR HOLDING A VEHICLE TAILGATE IN A PREDETERMINED PARTIALLY OPEN POSITION

[76] Inventor: Gary McLaughlin, 13300 Wingo St., Arleta, Calif. 91331

[21] Appl. No.: 569,799

[22] Filed: Dec. 8, 1995

[51] Int. Cl.[6] .................................................. B62D 33/03
[52] U.S. Cl. ........................................ 296/180.5; 296/57.1
[58] Field of Search ................................. 296/57.1, 180, 296/180.1, 180.5

[56] References Cited

U.S. PATENT DOCUMENTS

| 622,049 | 3/1899 | Kissinger | 296/57.1 |
| 1,125,982 | 1/1915 | Dufala | 296/57.1 |
| 2,561,081 | 7/1951 | Vars | 296/57.1 |
| 5,234,249 | 8/1993 | Dorrell | 296/57.1 |

FOREIGN PATENT DOCUMENTS

| 654632 | 12/1937 | Germany | 296/57.1 |

*Primary Examiner*—Gary C. Hoge
*Attorney, Agent, or Firm*—Lawrence S. Cohen

[57] ABSTRACT

A retaining device for holding the bottom-hinged tailgate of an open-bedded vehicle in a predetermined partially open position, thereby reducing the aerodynamic drag which is created by the vertical closed tailgate. The device includes a connector of predetermined length. A first coupler attaches the connector to the vehicle, and a second coupler attaches the connector to the tailgate.

18 Claims, 6 Drawing Sheets

FIG. 1
PRIOR ART
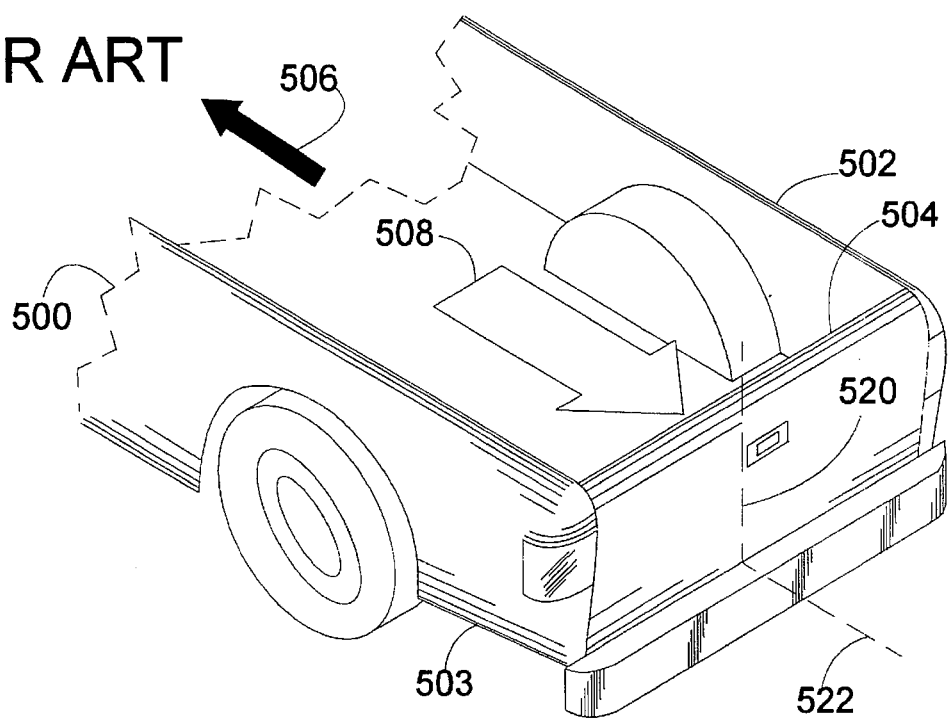
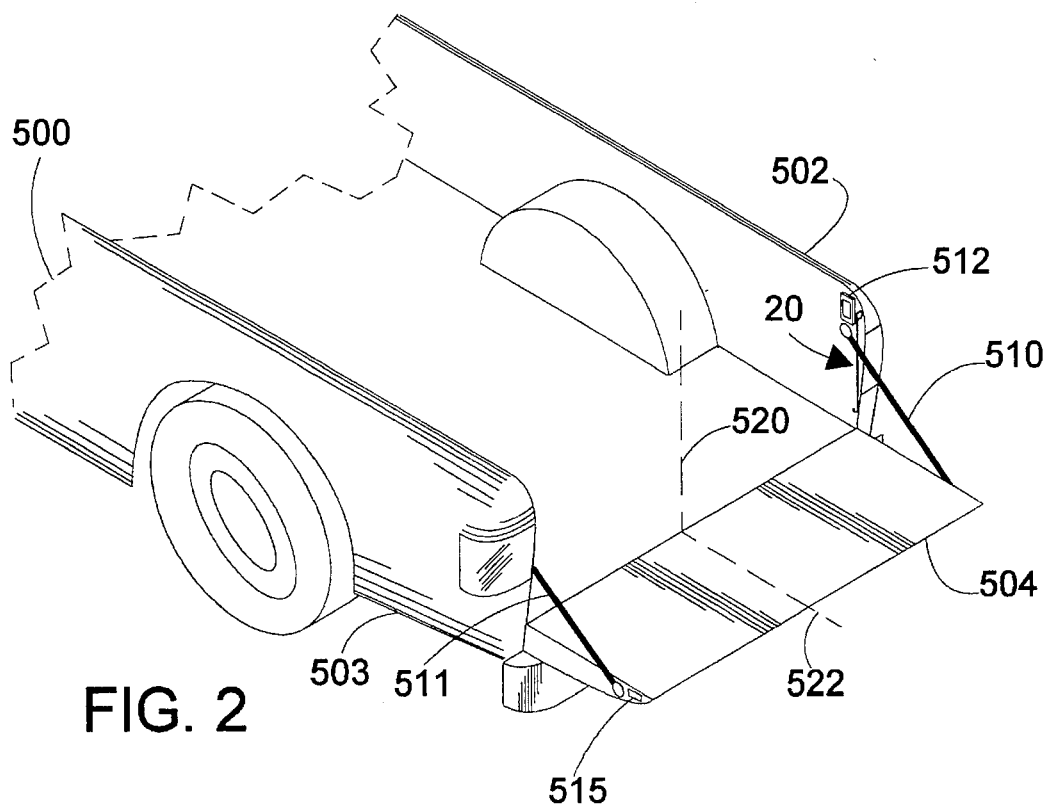
FIG. 2

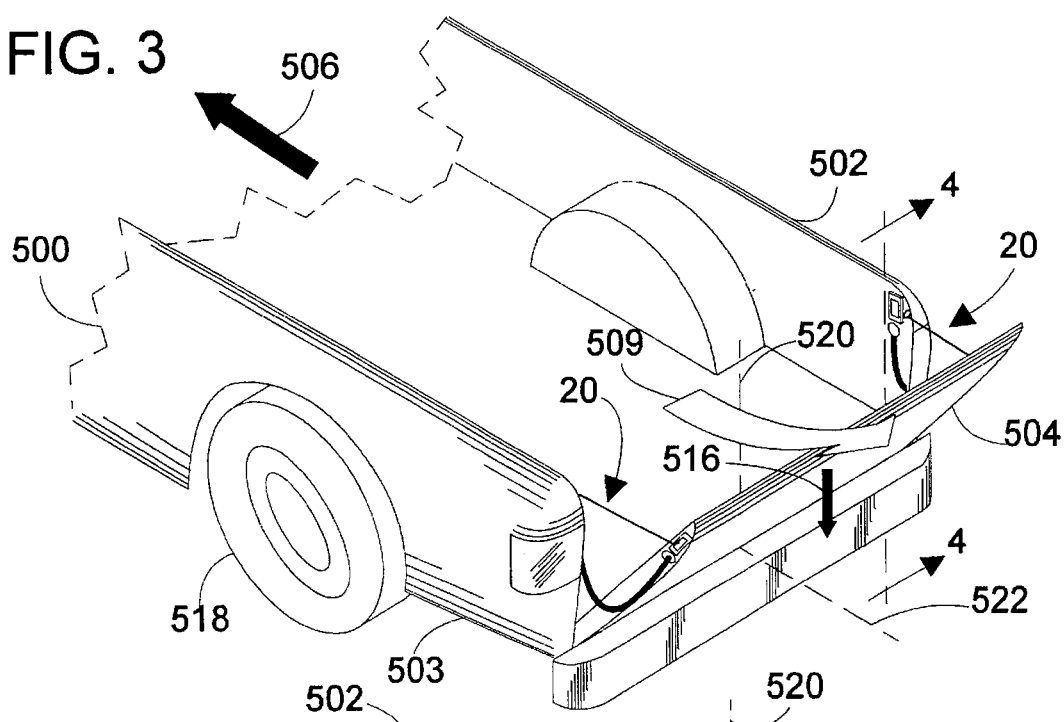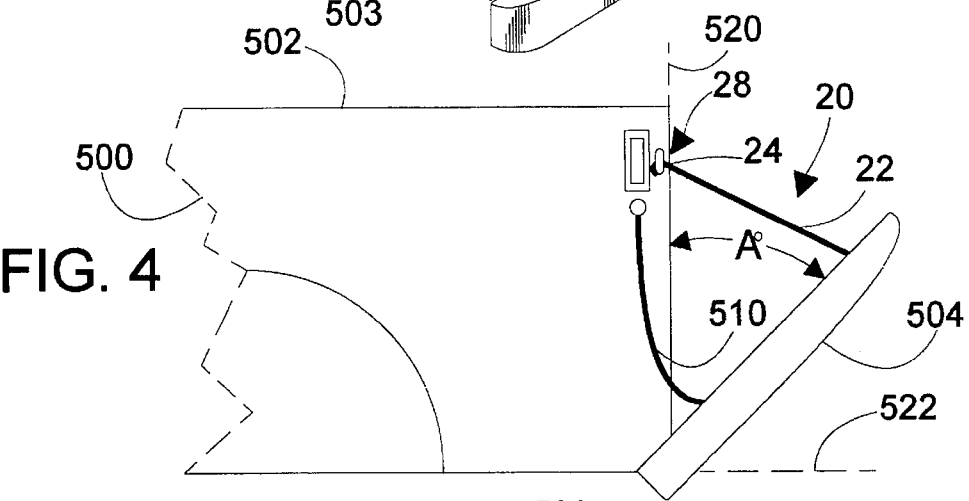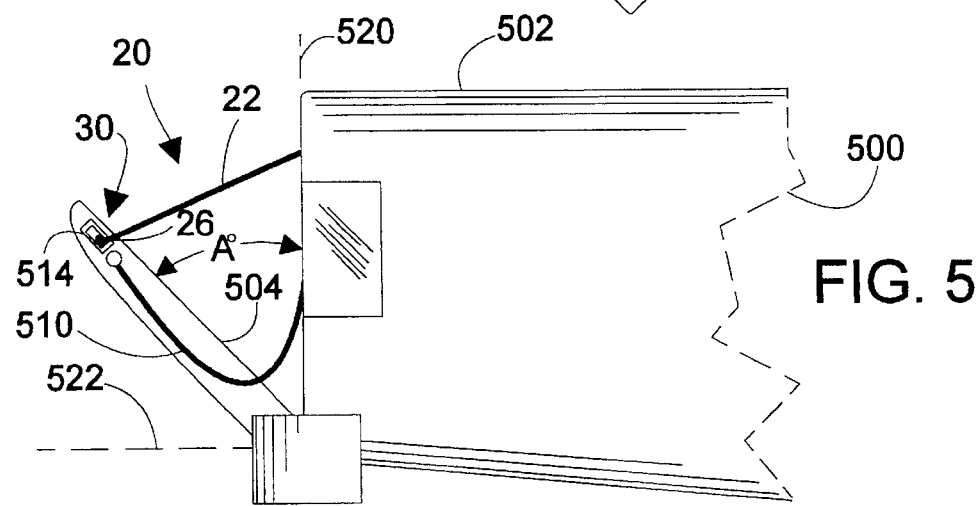

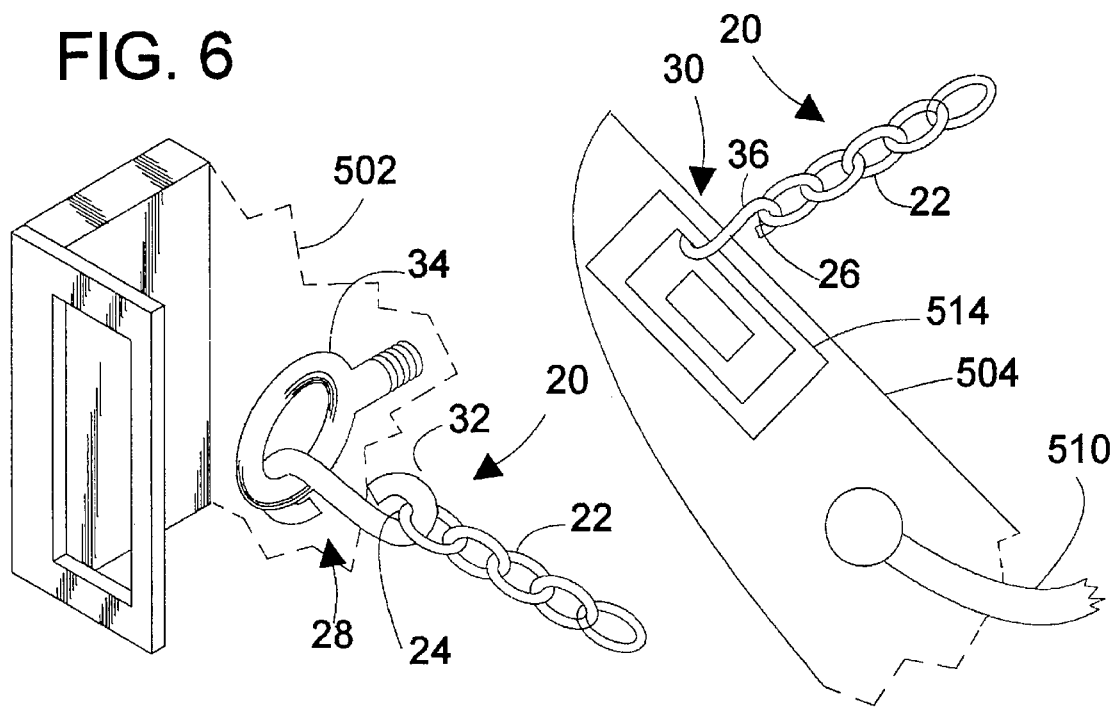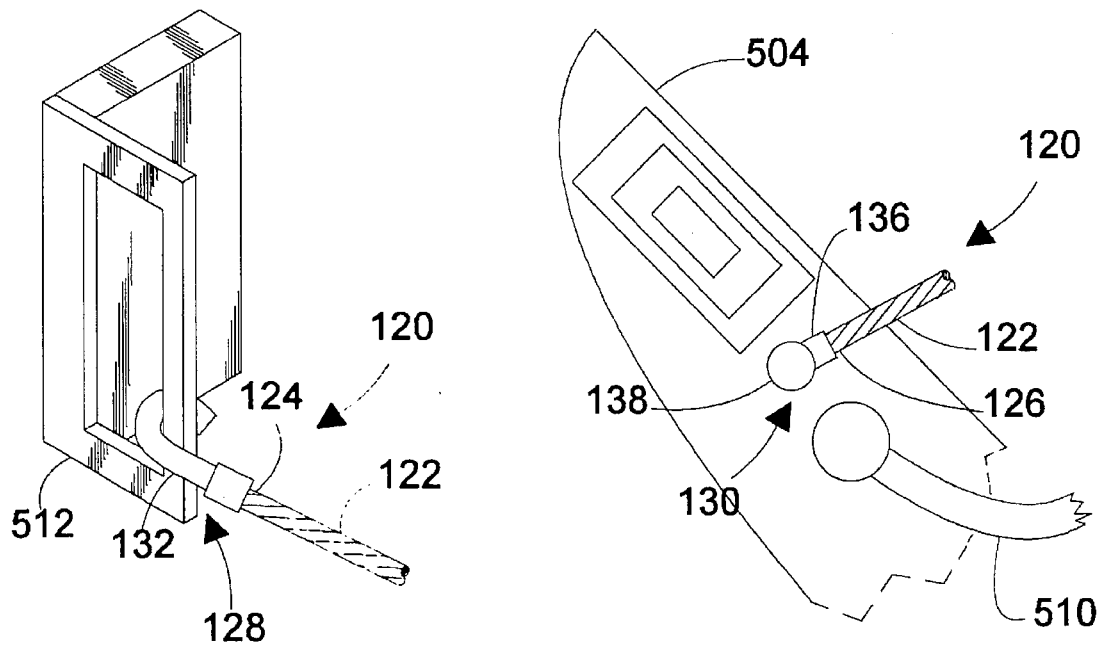

RETAINING DEVICE AND METHOD FOR HOLDING A VEHICLE TAILGATE IN A PREDETERMINED PARTIALLY OPEN POSITION

TECHNICAL FIELD

The present invention pertains to a retaining device and method for holding the bottom-hinged tailgate of an open-bedded vehicle in a predetermined partially open position thereby reducing the aerodynamic drag which is created by the vertical closed tailgate position.

BACKGROUND ART

Open-bedded vehicles having bottom-hinged tailgates have been known in the art for many years. In the substantially horizontal fully open position the tailgate permits cargo to be easily loaded into and unloaded from the bed of the vehicle. In the substantially vertical closed position the tailgate prevents the cargo from falling from the back of the vehicle while in transient. For years this tailgate configuration has been successfully utilized by the commercial and private sectors alike.

However, this classical tailgate design has one significant drawback, that of aerodynamic drag. When the vehicle is moving, the upright position of the tailgate can create an air dam which slows down the vehicle, or conversely, requires higher engine RPM and greater gasoline consumption to maintain the desired vehicle speed. In these days of energy consciousness, it is indeed proper to avoid such wasteful situations. To that end, many vehicle drivers have opted for the fabric type of tailgate, wherein the original factory-installed tailgate is totally removed and a webbed fabric netting is installed in its place. This design has the advantage of reducing aerodynamic drag, but has the decided disadvantages of (1) reduced strength in containing a cargo, (2) large holes through which small cargo item can freely pass, and (3) elimination of the flat tailgate surface for resting cargo items during loading and unloading.

DISCLOSURE OF INVENTION

The present invention is directed to a novel retaining device and method for holding the bottom-hinged tailgate of a vehicle in a predetermined partially open position thereby reducing the aerodynamic drag which is created by the vertical closed tailgate position. The present invention retains the strength and large cargo retention features of the tailgate, and additionally, the tailgate is still available as a rest during cargo loading and unloading.

In accordance with a preferred embodiment, the tailgate is held in a predetermined partially open position between the closed position and the fully open position by a connector of predetermined length having first and second attachment means connected to its first and second ends. The first attachment means is connected to the vehicle and the second attachment means is connected to the tailgate. The degree of partial openness is controlled by the predetermined length of the connector, the location of the first attachment means on the vehicle, and the location of the second attachment means on the tailgate.

In accordance with an important feature of the invention, the predetermined partially open position is substantially centered at 45° between the closed vertical position (0°) and the fully open horizontal position (90°), however any angular position between 0° and 90° can also be selected.

In accordance with an important aspect of the invention, the connector is fabricated from a chain, a cable, a rope, or a ridged elongated member.

In accordance with another important feature of the invention, the first and second attachment means include first and second couplers which can either attach to first and second anchors connected to the vehicle and tailgate respectively, or alternatively, can attach directly to points on the vehicle such as the latch strike or points on the tailgate such as the latch mechanism.

In accordance with a preferred embodiment of the invention, the vehicle has a factory-provided tailgate support which connects the vehicle and the tailgate, one of the first or second attachment means connecting to the tailgate support, and the other connecting to either the vehicle or tailgate respectively.

In accordance with a preferred embodiment of the invention, both the first and second attachment means connect to the tailgate support.

In accordance with a preferred embodiment of the invention, the first or second attachment means include clamps which connect to the tailgate support.

In accordance with a preferred embodiment of the invention, the connector defines a tailgate support segment having first and second attaching loops for connecting the vehicle and the tailgate. A separate shortening connector segment, of lesser length than the tailgate support segment, is selectively connected between the first and second attaching loops to place the tailgate in a partially open position.

In accordance with a preferred embodiment of the invention, the vehicle has a factory-provided tailgate support which includes a first bar pivotally connected to a second bar. The connector includes a shortening connector having one end connected to the vehicle and the opposite other end pivotally connected to the tailgate support.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of a vehicle with the tailgate in the substantially vertical closed position;

FIG. 2 is a perspective view of a vehicle with the tailgate in the substantially horizontal fully open position;

FIG. 3 is a perspective view of a vehicle with the tailgate held in a predetermined partially open position by the present invention;

FIG. 4 is a view of the inside of the right side panel of the vehicle, the tailgate and the present invention along the line 4—4 of FIG. 3;

FIG. 5 is a right side view of the right side panel of the vehicle, the right side of the tailgate and the present invention;

FIG. 6 is a perspective view of the first attachment means connected to the right side panel of the vehicle;

FIG. 7 is a right side view of the second attachment means connected to the right side of the tailgate;

FIG. 8 is a perspective view of a second embodiment showing the first attachment means connected to the right latch strike;

FIG. 9 is a right side view of a second embodiment showing the second attachment means connected to the right side of the tailgate;

MODES FOR CARRYING OUT THE INVENTION

Figure 10:
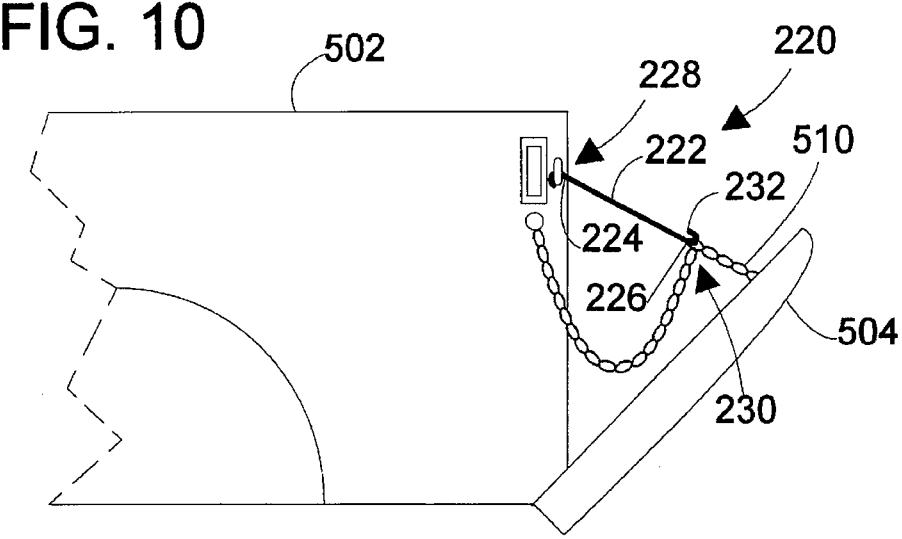
FIG. 10 is a view of a third embodiment.

Referring initially to FIG. 1, there is illustrated a perspective view of the rear portion of a vehicle 500 having a right side panel 502, a left side panel 503, and a bottom hinged tailgate 504 in the substantially vertical closed position. The tailgate 504 is oriented along vertical axis 520. The vehicle 500 is moving in direction 506. As the vehicle 500 moves, air is trapped by the tailgate and exerts a drag force 508 on the tailgate in a direction opposite to direction 506.

FIG. 2 is a perspective view of the vehicle 500 with the tailgate 504 in the substantially horizontal fully open position. The tailgate 504 is oriented along horizontal axis 522. A right tailgate support 510 consisting of a chain or cable, and a similar left tailgate support 511 can be used to provided additional strength when the tailgate 504 is in the open position. A right latch strike 512 is provided for engaging a right latch mechanism 514 (refer to FIG. 5) located on the right side of the tailgate 504. A left latch strike, hidden by left side panel 503, is provided for engaging a left latch mechanism 515 located on the left side of the tailgate 504. Also illustrated is a retaining device for holding the tailgate 504 in a predetermined partially open position in accordance with the present invention, the retaining device generally designated as 20. In this view the retaining device 20 is in the ready for use configuration, but has not been connected to the tailgate 504.

FIG. 3 is a perspective view of the vehicle 500 with the tailgate 504 held in a predetermined partially open position between the closed position and the fully open position by the present invention. Either one or two retaining devices 20 can be used to hold the tailgate in the desired partially open position. In the shown embodiment two retaining devices 20 are employed, one holding the right side of the tailgate 504 and one holding the left side of the tailgate 504. This configuration provides increased tailgate 504 support and further prevents bending moments from stressing the hinge of the tailgate 504. One retaining device 20 is connected between the right side panel 502 and the right side of the tailgate 504, and the other retaining device 20 is connected between the left side panel 503 and the left side of the tailgate 504. When the vehicle 500 moves in direction 506, air can now escape over the inclined partially open tailgate 504 thereby resulting in a smaller drag force 509. Additionally, the air passing over the tailgate 504 creates a downward force 516 upon the tailgate 504 and consequently upon the left rear tire 518 and right rear tire, hidden, of the vehicle 500. This spoiler effect can increase the traction of the rear tires on the riding surface.

FIG. 4 is a view of the inside of the right side panel 502 of the vehicle 500, the tailgate 504 and the present invention 20 along the line 4—4 of FIG. 3. FIG. 5 is a right side view of the right side panel 502 of the vehicle 500, the right side of the tailgate 504 and the present invention 20. The retaining device 20 comprises a connector 22 of predetermined length having a first end 24 and a second end 26 opposite to the first end. The connector 22 can be constructed from a chain, a cable, a rope, an elongated ridged member, or any other material that is sufficiently strong to hold the tailgate 504 in a partially open position.

A first attachment means 28 is connected to the first end 24, and a second attachment means 30 is connected to the second end 26. In use, the first attachment means 28 is also connected to the vehicle 500, and the second attachment means 30 is also connected to the tailgate 504. The degree of openness of the tailgate 504 is controlled by the predetermined length of the connector 22, the location of the first attachment means 28 on the vehicle 500, and the location of the second attachment means 30 on the tailgate 504. The predetermined length of connector 22 is such that when connector 22 is connected to the vehicle 500 and tailgate 504, the tailgate 504 is held in the desired partially open position. A partially open position that is approximately centered between the closed position and the fully open position is found to be useful, however other less or more open positions can also be used. The specific location of the first attachment means 28 on the vehicle 500 and the second attachment means on the tailgate 504 can vary according to vehicle 500 design and user preference. A second retaining device 20 can be similarly connected between the left side panel 503 and the left side of the tailgate 504. In angular terms, the retaining device 20 holds the tailgate 504 at an angle A° that is between the closed position defined by vertical axis 520 and the fully open position as defined by horizontal axis 522.

The retaining device 20 is used to hold the tailgate 504 partially open in a predetermined partially open position as follows. The tailgate 504, initially in the vertical closed position, is unlatched and opened. The first attachment means 28 is connected to the vehicle 500, and the second attachment means 30 is connected to the tailgate 504 so that the tailgate 504 is held in a partially open position.

FIG. 6 is a perspective view of the first attachment means 28 connected to the right side panel 502 of the vehicle 500. FIG. 7 is a right side view of the second attachment means 30 connected to the right side of the tailgate 504. In the embodiment shown the first attachment means 28 includes a first coupler 32 connected to the first end 24 of chain connector 22. The first attachment means 28 additionally includes a first anchor 34 connected to the right side panel 502 of the vehicle 500. The first coupler 32 attaches to the first anchor 34 of vehicle 500. The first coupler 32 can take a variety of forms, such as the shown "S" hook, a bolt snap, a spring snap, a hook, a link, a lug, etc. The first coupler 32 is preferably permanently attached to the first end 24 of the connector 22 although it could be attached removeably. The first coupler 32 is adapted to be permanently or removable attached to the first anchor 34. In the preferred embodiment shown in FIG. 6, the first coupler 32 is captively connected to the first anchor 34, and therefore when not in use, hangs vertically downward. The first anchor 34 can also take many forms such as the shown "Eye-bolt", a screw hook, a bolt hook, a bolt, etc. The first anchor 34 can be removeably attached to any convenient point on the right side panel 502 or left side panel 503 of the vehicle 500, or could be permanently attached such as by welding. Also, in FIG. 6 the first coupler 32 is captively connected to the connector 22.

Referring to FIG. 7 in the embodiment shown, the second attachment means 30 includes a second coupler 36 connected to the second end 26 of the chain connector 22. The second coupler 36 can take a variety of forms, such as the shown "S" hook, a bolt snap, a spring snap, a hook, a link, a lug, etc. The second coupler 36 is preferably permanently attached to the second end 26 of the connector 22 although it could be attached removeably. The second coupler is also attached to the right latch mechanism 514 of the tailgate 504, but could also be attached to any other convenient point on the tailgate 504. Therefore, through the combined actions of the connector 22, the first coupler 32 attached to the first anchor 34, and the second coupler 36 attached to the right latch mechanism 514, the tailgate 504 is held in a predetermined partially open position.

FIG. 8 is a perspective view of a second embodiment, generally designated as 120, showing a first attachment means 128 connected to the right latch strike 512. FIG. 9 is a right side view of the second embodiment 120 showing a second attachment means 130 connected to the right side of the tailgate 504. In the embodiment shown the first attachment means 128 includes a first coupler 132 connected to the first end 124 of the cable connector 122. The first coupler 132 is also attached to the right latch strike 512. The first coupler 132 can take a variety of forms, such as the shown hook, a "S" hook, a bolt snap, a spring snap, a link, a lug, etc. The first coupler 132 is preferably permanently attached to the first end 124 of the connector 122 and removeably attached to the right latch strike 512. Although a simple hook configuration is shown for the first coupler 132, a latching type hook is preferable in order to keep it in place in a moving vehicle.

In the embodiment shown, the second attachment means 130 includes a second coupler 136 connected to the second end 126 of the connector 122. The second attachment means 130 additionally includes a second anchor 138 connected to the tailgate 504. The second coupler 136 is adapted for attachment to the second anchor 138. The second coupler 136 can take a variety of forms such as the shown lug, a "S" hook, a bolt snap, a spring snap, a hook, a link, etc. The second coupler 136 is preferably permanently attached to the second end 126 of the connector 122 and removeably attached to the second anchor 138. The second coupler 136 can also be permanently or removable attached to the second anchor 138. The second anchor 138 can also take many forms such as the shown bolt, an "Eye-bolt", a screw hook, a bolt hook, etc. The second anchor 138 can be removeably attached to the tailgate 504, or could be permanently attached such as by welding.

FIG. 10 is a view of a third embodiment, generally designated as 220. The first end 224 of ridged elongated connector 222 is connected to the right side panel 502 of the vehicle 500 by a first attachment means 228. The second end 226 of the connector 222 is connected to the tailgate 504 by way of the tailgate support 510 by a second attachment means 230. In the shown embodiment, the tailgate support 510 consists of a flexible member such as a chain, and the second attachment means 230 includes a hook 232 which engages the chain of the tailgate support 510, so that the tailgate 504 is held in the desired partially open position. In this embodiment, the connection can also be reversed with the first attachment means 228 connecting to the vehicle 500 by way of tailgate support 510, and the second attachment means 230 connecting to the tailgate 504. The hook 232 can be a simple open hook but is preferably a latched hook to avoid being dislodged. The attachment means 228 is preferably a permanent attachment.

Figure 15:
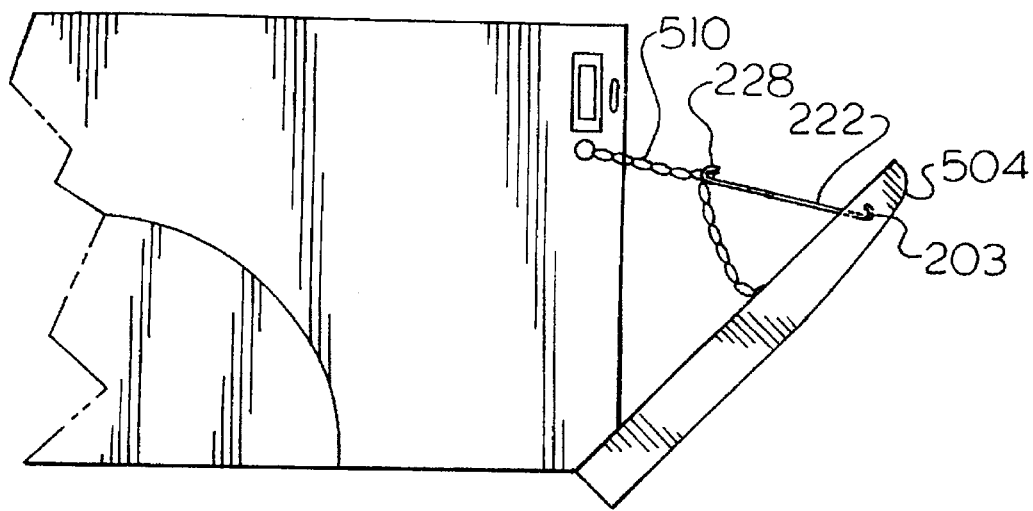
FIG. 15 is a view of another embodiment.

This arrangement is shown in FIG. 15.

Figure 11:
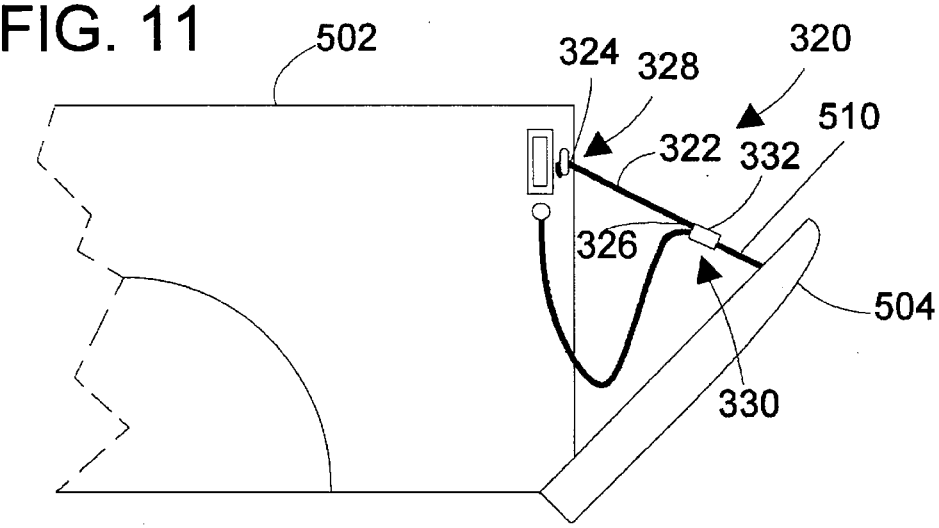
FIG. 11 is a view of a fourth embodiment.

FIG. 11 is a view of a fourth embodiment, generally designated as 320. The first end 324 of the connector 322 is connected to the right side panel 502 of the vehicle 500 by a first attachment means 328 which is preferably permanently attached. The second end 326 of the connector 322 is connected to the tailgate 504 by way of tailgate support 510 by a second attachment means 330. In the shown embodiment, the tailgate support 510 consists of a cable, and the second attachment means 330 includes a cable clamp 332 which clamps the connector 322 and tailgate support 510 firmly together, so that the tailgate 504 is held in the desired partially open position. In this embodiment, the connection can also be reversed with the first attachment means 328 connected to the vehicle 500 by way of tailgate support 510 and including a cable clamp 332 which clamps the connector 322 and the tailgate support 510 firmly together, and the second attachment means 330 connecting to the tailgate 504.

Figure 16:
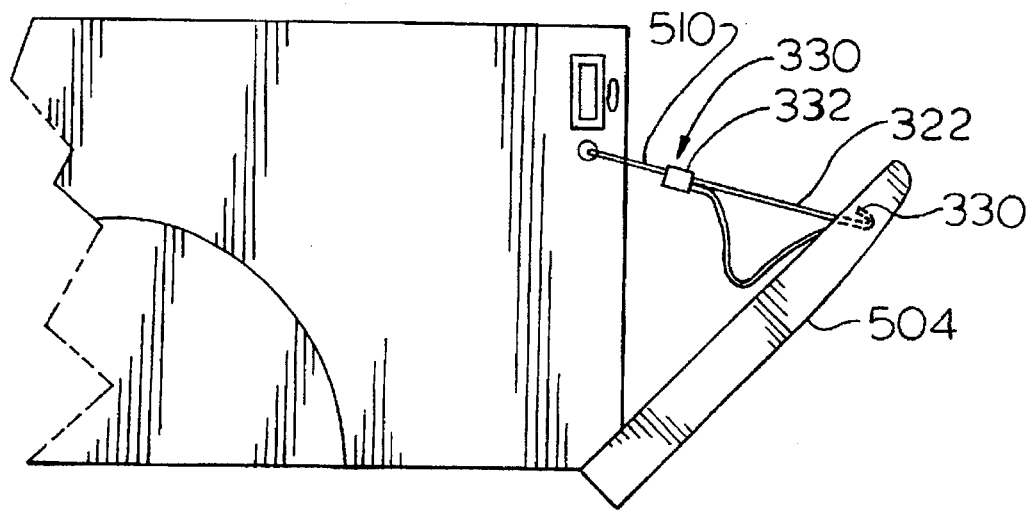
FIG. 16 is a view of another embodiment.

This arrangement is shown in FIG. 16.

Figure 12:
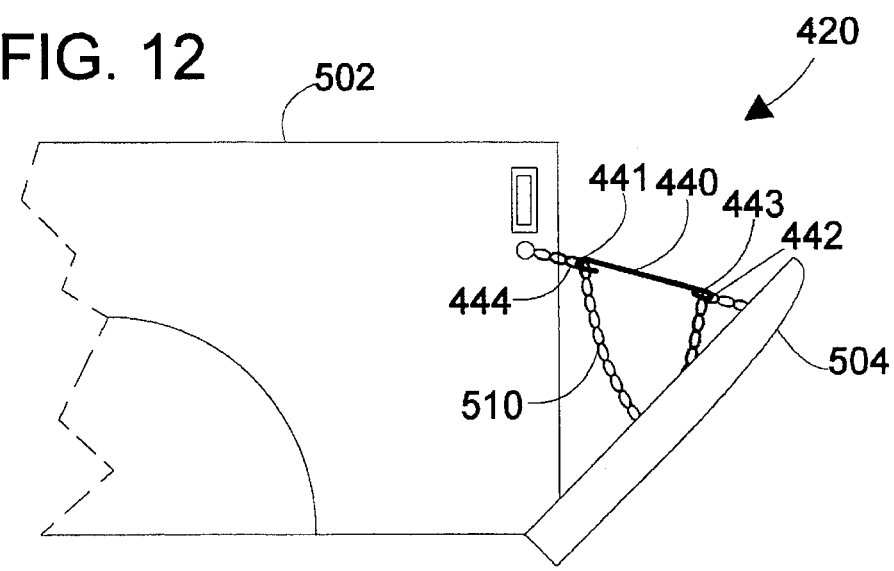
FIG. 12 is a view of a fifth embodiment.

FIG. 12 shows a fifth embodiment, generally designated as 420, especially applicable after-market application, which advantageously requires no modification of the vehicle such as the addition of the first anchor 34 as shown in FIG. 6 or the second anchor 138 as shown in FIG. 9. In this embodiment the connector 440 is permanently attached at one end to the tailgate support 510 which is originally supplied with the vehicle. In FIG. 12 the tailgate support 510 is shown as a chain. A connector 440 such as a rod has a first attachment means including a first end 441 and a second attachment means including a second end 443. These ends are defined by a loop or hook shape which can attach to the vehicle 500 and the tailgate 504 by way of a chain link of tailgate support 510. The connector 440 is shown as being permanently attached at its second end 443, on the tailgate support 510 at a point 442 near the tailgate 504, by closing the hook at 443 after installing it on a selected chain link. When not in use the connector 440 will hang freely from its attachment to the tailgate support 510 at point 442. When in use the first end 441 of the connector 440 will be attached to a selected link of the tailgate support 510 near the vehicle body such as at a point 444. In this embodiment the first end 441 can be a simple hook or it can be a latched hook for greater security. The second end 443 can also be a latched hook, which is deemed equivalent to a permanent attachment, although a truly permanent attachment such as a closed hook could be used. However, for the most economical and desirable construction the connector 440 can be made of a flexible elongated element such as a cable terminated at each end by identical latched hooks. In this embodiment the intermediate position of the tailgate can be variably selected by choosing the links in the chain 510 to which the connector will be attached to effect shortening of the chain 510.

Figure 13:
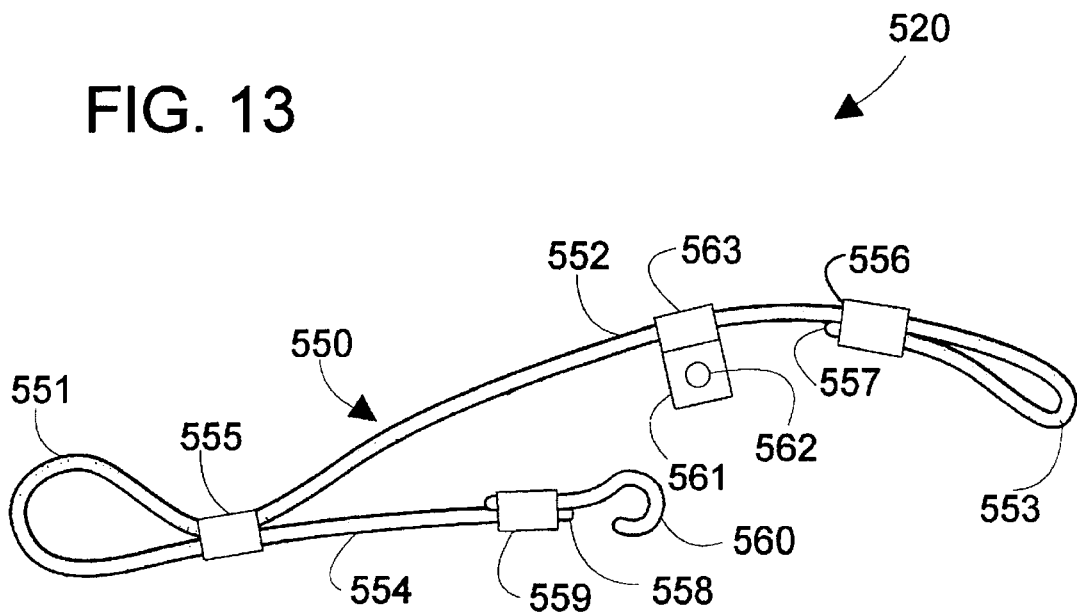
FIG. 13 is a view of a sixth embodiment.

FIG. 13 shows a sixth embodiment of the present invention, generally designated as 520, in which the tailgate support and connector are incorporated into an integrated structure. This can be used as original or as an after market replacement. In this embodiment a single elongate element 550, such as a cable is formed to have a first attaching loop 551, a tailgate support segment 552, a second attaching loop 553 and a shortening connector segment 554. The first attaching loop 551 is formed of a bight in the cable created by a first clamp fitting 555. The first clamp fitting 555 can be permanent or adjustable. The second attaching loop 553 is formed of a bight in the cable created by a second clamp fitting 556, which is preferably permanent, but could be made adjustable. The second attaching loop 553 is made near one terminal end 557 of the elongate element 550. A third clamp fitting 563 is attached to tailgate support segment 552 and has on it an anchor means such as tab 561 in which is an anchor hole 562. The shortening connector segment 554 ends in a second terminal end 558 of the elongate element 550. At the end 558 there is attached a fourth clamp fitting 559, and a hook 560. The clamp fitting 559 may be adjustable along the length of the shortening connector segment 554 to select the effective length between hook 560 and attaching loop 551, or this distance may be pre- selected fitting 559 in place and fixed by permanently fixing clamp 559. The first attaching loop 551 will attach to the vehicle body while the second attaching loop 553 will attach to the vehicle tailgate. Thus the tailgate support segment 552 will function as a conventional tailgate support, being long enough to allow the tailgate to open to a horizontal position as shown in FIG. 2.

The connector segment 554 is of such length that the hook 560 can be hooked into the anchor hole 562 to hold the tailgate in a partially open position, preferably at a 45° angle. But, by loosening the clamp fitting 559, if it is adjustable, the length of the connector segment 554 can be shortened, or lengthened. Thus, if the connector segment 554 is chosen of sufficient length, the amount of opening of the tailgate can be selected to a desired position.

The entire device can be mounted reversely.

The hook 560 is preferably of the latching type to prevent unintended dislodgement.

To supply the item as an after-market product, the elongate element 550, in this case cable, can be supplied in a length sufficient for a range of applications, and the first, second, third, and fourth clamps 555, 556, 563, and 559 applied at desired points to establish the requisite lengths for the tailgate support segment 552 and the connector segment 554 with excess cable being cut off at the terminal end 558. Thus this structure can be sold as a universal product for after-market distribution.

Figure 14:
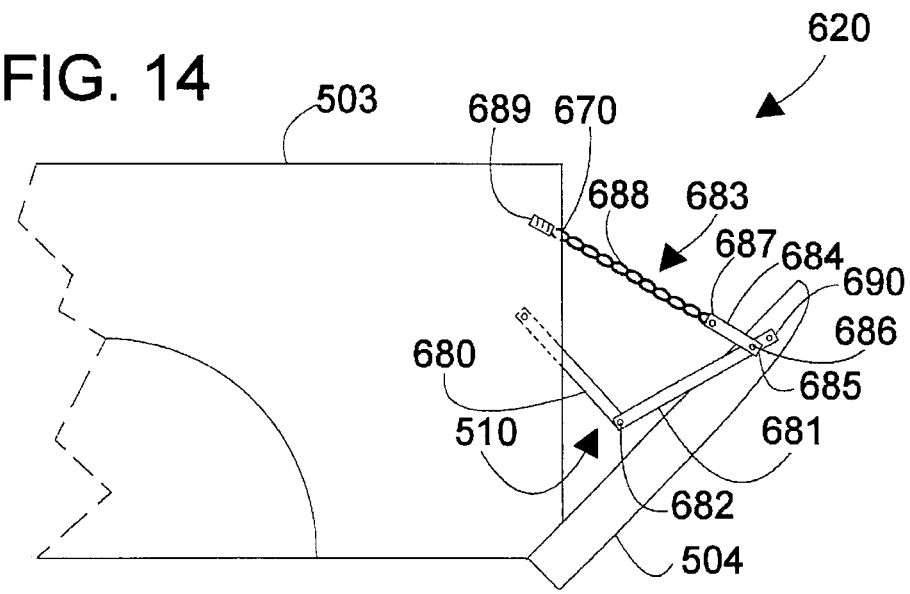
FIG. 14 is a view of a seventh embodiment.

FIG. 14 shows a seventh embodiment, generally designated as 620, for use with bar-type tailgate supports. In this embodiment a conventional tailgate support 510 consists of a first bar 680 and a second bar 681 pivotally connected at pivot 682. A shortening connector 683 having a first end 670 which includes an attachment means for connection to vehicle 500 is employed. The shortening connector 683 has a second end 685 which includes an attachment means for pivotally connecting to the tailgate 504 by way of tailgate support 510. The shortening connector 683 has an adaptor bar 684 which is pivotally attached at one end 685 to the second bar 681 at a selected point 686. The adaptor bar is made of flat stock in order to fit in the space available when the tailgate 504 is closed. At a second end 687 the adaptor bar 684 has attached a flexible elongate member such as a chain 688. The chain terminates in a Shock 689. In use Shock 689 will be attached to an available point on the vehicle body in the latch strike area. The point of attachment 686 of adaptor bar 684 to the second bar 681 should be as close to the end 690 of the second bar 681 as is possible. The length of the chain 688 will determine the degree of opening available when the Shock 689 is attached. The chain 688 could be substituted by a cable and the Shock 689 could be any type of hook including a latching hook for security.

From the foregoing it should now be recognized that a retaining device and method for holding a vehicle tailgate in a predetermined partially open position or in selectively variable partially open position have been disclosed herein. The preferred embodiments of the invention described herein are exemplary and numerous modifications, dimensional variations and rearrangements can be readily envisioned to achieve an equivalent result, all of which are intended to be embraced within the scope of the appended claims.

Although particular embodiments of the invention have been described and illustrated herein, it is recognized that modifications and variations may readily occur to those skilled in the art, and consequently it is intended that the claims be interpreted to cover such modifications and equivalents.

I claim:

1. In a vehicle having a bottom-hinged tailgate, the tailgate having a substantially vertical closed position and a substantially horizontal fully open position, a retaining device for holding the tailgate in a predetermined partially open position between the closed position and the fully open position, comprising:

a connector of a predetermined length, said connector having a first end and a second end opposite to said first end;

a first attachment means for connecting said first end to the vehicle;

a second attachment means for connecting said second end to the tailgate;

at least one of said first and second attachment means having a portion attached to the vehicle in the case of said first attachment means, or to said tailgate in the case of said second attachment means, such that said connector will be overlapped when said tailgate is closed; and said predetermined length being such that when said connector is connected to the vehicle and to the tailgate, the tailgate is held in said predetermined partially open position.

2. A retaining device according to claim 1, wherein said predetermined partially open position is substantially centered between the closed position and the fully open position.

3. A retaining device according to claim 1, wherein said connector includes a chain.

4. A retaining device according to claim 1, wherein said connector includes a cable.

5. A retaining device according to claim 1, wherein said connector includes a rope.

6. A retaining device according to claim 1, wherein said connector includes a rigid elongated member.

7. A retaining device according to claim 1, wherein said first attachment means includes a first coupler connected to said first end, and said second attachment means includes a second coupler connected to said second end.

8. A retaining device according to claim 7, said first coupler adapted for connection to the vehicle.

9. A retaining device according to claim 7, said first attachment means further including a first anchor adapted for connection to the vehicle, said first coupler adapted for attachment to said first anchor.

10. A retaining device according to claim 7, said second coupler adapted for connection to the tailgate.

11. A retaining device according to claim 7, said second attachment means further including a second anchor adapted for connection to the tailgate, said second coupler adapted for attachment to said second anchor.

12. In a vehicle having a bottom-hinged tailgate, the tailgate having a substantially vertical closed position and a substantially horizontal fully opened position, a retaining device for holding the tailgate in a predetermined partially open position between the closed position and the fully opened position comprising:

a connector of a predetermined length, said connector having a first end and a second end opposite to said first end;

a first attachment means for connecting said first end to the vehicle;

a second attachment means for connecting said second end to the tailgate; the vehicle having a tailgate support connecting the vehicle and the tailgate, said first attachment means adapted for connection to the vehicle, and said second attachment means adapted for connection to the tailgate by way of the tailgate support.

13. In a vehicle having a bottom-hinged tailgate, the tailgate having a substantially vertical closed position and a substantially horizontal fully opened position, a retaining device for holding the tailgate in a predetermined partially open position between the closed position and the fully opened position comprising:

a connector of a predetermined length, said connector having a first end and a second end opposite to said first end;

a first attachment means for connecting said first end to the vehicle;

a second attachment means for connecting said second end to the tailgate; the vehicle having a tailgate support connecting the vehicle and the tailgate, said first attachment means adapted for connection to the vehicle by way of the tailgate support, and said second attachment means adapted for connection to the tailgate.

14. In a vehicle having a bottom-hinged tailgate, the tailgate having a substantially vertical closed position and a substantially horizontal fully opened position, a retaining device for holding the tailgate in a predetermined partially open position between the closed position and the fully opened position comprising:

a connector of a predetermined length, said connector having a first end and a second end opposite to said first end;

a first attachment means for connecting said first end to the vehicle;

a second attachment means for connecting said second end to the tailgate; the vehicle having a tailgate support connecting the vehicle and the tailgate, said first attachment means adapted for connection to the vehicle by way of the tailgate support, and said second attachment means adapted for connection to the tailgate by way of the tailgate support.

15. In a vehicle having a bottom-hinged tailgate, the tailgate having a substantially vertical closed position and a substantially horizontal fully opened position, a retaining device for holding the tailgate in a predetermined partially open position between the closed position and the fully opened position comprising:

a connector of a predetermined length, said connector having a first end and a second end opposite to said first end;

a first attachment means for connecting said first end to the vehicle;

a second attachment means for connecting said second end to the tailgate; the vehicle having a tailgate support connecting the vehicle and the tailgate, said first attachment means adapted for connection to the vehicle, and said second attachment means adapted for connection to the tailgate by way of the tailgate support, said second attachment means further including a clamp adapted for connection to the tailgate support.

16. In a vehicle having a bottom-hinged tailgate, the tailgate having a substantially vertical closed position and a substantially horizontal fully opened position, a retaining device for holding the tailgate in a predetermined partially open position between the closed position and the fully opened position comprising:

a connector of a predetermined length, said connector having a first end and a second end opposite to said first end;

a first attachment means for connecting said first end to the vehicle;

a second attachment means for connecting said second end to the tailgate; the vehicle having a tailgate support connecting the vehicle and the tailgate, said first attachment means adapted for connection to the vehicle by way of the tailgate support, said first attachment means further including a clamp adapted for connection to the tailgate support, and said second attachment means adapted for connection to the tailgate.

17. In a vehicle having a bottom-hinged tailgate, the tailgate having a substantially vertical closed position and a substantially horizontal fully opened position, a retaining device for holding the tailgate in a predetermined partially open position between the closed position and the fully opened position comprising:

a connector of a predetermined length, said connector having a first end and a second end opposite to said first end;

a first attachment means for connecting said first end to the vehicle;

a second attachment means for connecting said second end to the tailgate; further including:
    said connector defining a tailgate support segment for connecting the vehicle and the tailgate;
    said first and second attachment means including first and second attaching loops respectively;
    a shortening connector segment having a first end and an opposite second end, said first end connected to said first attaching loop;
    said second end of said shortening connector segment having a hook; and,
    a tab having a hole adapted to receive said hook connected to said second attaching loop.

18. In a vehicle having a bottom-hinged tailgate, the tailgate having a substantially vertical closed position and a substantially horizontal fully opened position, a retaining device for holding the tailgate in a predetermined partially open position between the closed position and the fully opened position comprising:

a connector of a predetermined length, said connector having a first end and a second end opposite to said first end;

a first attachment means for connecting said first end to the vehicle;

a second attachment means for connecting said second end to the tailgate; the vehicle having a tailgate support including a first bar pivotally connected to a second bar, said retaining device further including:
    said connector including a shortening connector having a first end and an opposite second end;
    said first attachment means including said first end of said shortening connector adapted for connection to the vehicle;
    said second attachment means including said second end of said shortening connector adapted to be pivotally connected to the tailgate by way of the tailgate support.

* * * * *